(12) United States Patent
Murase

(10) Patent No.: US 10,015,373 B2
(45) Date of Patent: Jul. 3, 2018

(54) IMAGE PROCESSING METHOD AND IMAGE PROCESSING APPARATUS FOR EXECUTING IMAGE PROCESSING METHOD

(71) Applicant: IIX INC., Tokyo (JP)

(72) Inventor: Hiroshi Murase, Tokyo (JP)

(73) Assignee: IIX INC., Tokyo (JP)

( * ) Notice: Subject to any disclaimer, the term of this patent is extended or adjusted under 35 U.S.C. 154(b) by 147 days.

(21) Appl. No.: 15/125,936

(22) PCT Filed: Jul. 15, 2014

(86) PCT No.: PCT/JP2014/068782
§ 371 (c)(1),
(2) Date: Sep. 13, 2016

(87) PCT Pub. No.: WO2016/009493
PCT Pub. Date: Jan. 21, 2016

(65) Prior Publication Data
US 2018/0027149 A1    Jan. 25, 2018

(51) Int. Cl.
*H04N 5/217* (2011.01)
*H04N 5/232* (2006.01)
*G09G 3/3208* (2016.01)

(52) U.S. Cl.
CPC ......... *H04N 5/2173* (2013.01); *G09G 3/3208* (2013.01); *H04N 5/23212* (2013.01);
(Continued)

(58) Field of Classification Search
CPC ............ H04N 5/2173; H04N 5/23229; H04N 5/23212; G09G 3/3208; G09G 2320/029; G09G 2320/0233; G09G 2340/0464
See application file for complete search history.

(56) References Cited

U.S. PATENT DOCUMENTS

| | | | | |
|---|---|---|---|---|
| 5,764,209 A | * | 6/1998 | Hawthorne | G06F 11/2221 345/87 |
| 2015/0377798 A1 | * | 12/2015 | Zhu | G01N 21/956 356/601 |

FOREIGN PATENT DOCUMENTS

| | | |
|---|---|---|
| JP | H08327496 A | 12/1996 |
| JP | 2000338000 A | 12/2000 |

(Continued)

OTHER PUBLICATIONS

ISA Japanese Patent Office, International Search Report Issued in Application No. PCT/JP2014/068782, dated Oct. 21, 2014, WIPO, 4 pages.

*Primary Examiner* — Twyler Haskins
*Assistant Examiner* — Angel L Garces-Rivera
(74) *Attorney, Agent, or Firm* — Alleman Hall Creasman & Tuttle LLP

(57) ABSTRACT

Provided is an image processing method, an image processing apparatus, and the like according to which the influence of moiré can be suppressed without incurring a decrease in image resolution. An image is captured in a state in which moiré, which appears when capturing an image in-focus, has appeared, a first image is generated by removing a spatial frequency component corresponding to the moiré from the captured image using a high-pass filter, an image is captured out-of-focus by the camera, a second image is generated by applying a low-pass filter to the captured image, and a third image in which the moiré is eliminated or suppressed is generated by compositing the first image and the second image.

6 Claims, 7 Drawing Sheets

(52) U.S. Cl.
CPC ... *H04N 5/23229* (2013.01); *G09G 2320/029* (2013.01); *G09G 2320/0233* (2013.01); *G09G 2340/0464* (2013.01)

(56) References Cited

FOREIGN PATENT DOCUMENTS

| | | |
|---|---|---|
| JP | 2008011334 A | 1/2008 |
| JP | 2010057149 A | 3/2010 |
| JP | 2010203889 A | 9/2010 |
| WO | 2010123063 A1 | 10/2010 |
| WO | 2014050222 A1 | 4/2014 |

\* cited by examiner

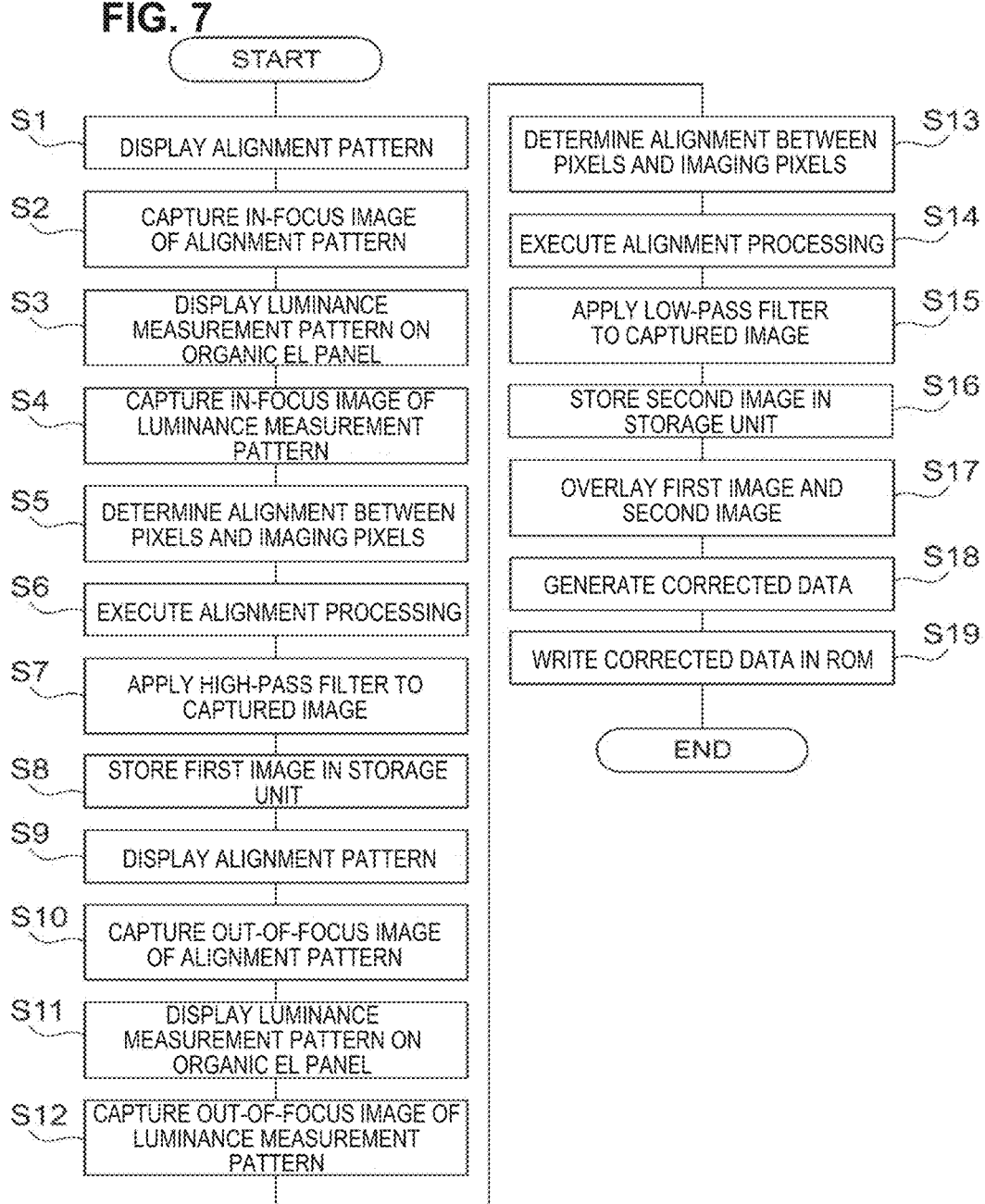

IMAGE PROCESSING METHOD AND IMAGE PROCESSING APPARATUS FOR EXECUTING IMAGE PROCESSING METHOD

TECHNICAL FIELD

The present invention relates to an image processing method and an image processing apparatus for executing the image processing method, and in particular relates to an image processing method in which an image displayed on a display panel in which pixels are aligned periodically, is captured by a camera in which imaging pixels are aligned periodically, and thus moiré is removed from or suppressed in the captured image, and to an image processing apparatus for executing this image processing method.

BACKGROUND ART

With a display panel such as a liquid crystal panel or an organic EL panel, an image or video is displayed using a collection of pixels having R (red), G (green), and B (blue) sub-pixels, which correspond to the three primary colors of light. With this kind of display panel, in general, display unevenness sometimes occurs due to variations in machining accuracy in the manufacturing step. The display unevenness is largely divided into luminance unevenness and color unevenness.

Luminance unevenness occurs in the case where there is a difference in absolute brightness between nearby pixels. On the other hand, color unevenness occurs in the case where the relationship between the relative brightnesses of R, and B in an individual pixel differs between nearby pixels.

In particular, due to the fact that it is difficult to make the thickness of an organic compound layer for each pixel even, organic EL panels have a characteristic such that display unevenness caused by the layer thickness of the organic compound layer being uneven is likely to occur.

As a countermeasure against this, Patent Document 1 has proposed a luminance measurement method that aims to improve image quality of a display panel by illuminating pixels of the display panel, performing image capture using a camera including a solid-state image sensor, and measuring the luminance of the pixels so as to detect display unevenness and correct the detected display unevenness.

However, in the case of capturing an image of a display panel in which pixels are aligned periodically with a solid-state image sensor camera in which imaging pixels on an image capture plane are aligned periodically, moiré, which is also referred to as "interference fringe," appears in the captured image due to misalignment occurring between the period in which the pixels are aligned and the period in which the imaging pixels are aligned.

When the luminance of the pixels is measured based on the captured image in which moiré appears, the influence of the moiré needs to be suppressed due to the fact that the luminance cannot be accurately measured due to pixels at positions corresponding to the moiré on the display panel being measured as being dark.

As a countermeasure against this, Patent Document 2 discloses a method of converting signals of a spatial axis of an image in which moiré appears into signals of a frequency axis, removing frequency components that correspond to the moiré from the signals of the frequency axis, and thereafter re-converting the signals of the frequency axis from which the frequency components corresponding to the moiré have been removed into the signals of the spatial axis.

According to this moiré removal method, signals of the spatial axis of an image in which moiré with a constant period appears are converted into signals of a frequency axis, whereby the frequency components corresponding to the moiré can be removed.

CITATION LIST

Patent Document

Patent Document 1: JP 2010-203889A
Patent Document 2: JP 2008-011334A

SUMMARY OF INVENTION

Technical Problem

However, according to the moiré removal method disclosed in Patent Document 2 described above, it is difficult to remove only the frequency components corresponding to the moiré, and there is concern that the resolution of the image will drop due to the fact that frequency components other than the frequency components corresponding to the moiré are also removed when the moiré is removed.

The present invention has been made with the above issues in mind, and aims to provide an image processing method according to which the influence of moiré can be suppressed without incurring a drop in the resolution of an image, and an image processing apparatus that executes the image processing method.

Solution to Problem

An image processing method for solving the foregoing problem is an image processing method of capturing a display image of a display panel in which pixels are aligned periodically using a camera in which imaging pixels are aligned periodically, and processing the image captured by the camera, including: an in-focus image capturing step of capturing the display image in-focus using the camera; a first image generation step of generating a first image by applying a high-pass filter to the image captured in the in-focus image capturing step and removing or reducing a spatial frequency component corresponding to moiré that appears in the captured image; an out-of-focus image capturing step of capturing the display image out-of-focus using the camera; a second image generation step of generating a second image by applying a low-pass filter to the image captured in the out-of-focus image capturing step; and a third image generation step of generating a third image in which the moiré is eliminated or suppressed, by compositing the first image and the second image.

With this configuration, the first image is generated by applying the high-pass filter to the captured image captured in-focus in the in-focus image capturing step and removing or reducing the spatial frequency component corresponding to the moiré, and the second image is generated by applying the low-pass filter to the captured image captured out-of-focus in the out-of-focus image capturing step.

The thus-generated first image and second image are composited, the spatial frequency component that was lost due to the moiré being removed from or reduced in the first image is interpolated using the second image, which was generated by applying the low-pass filter, and thereby a third image in which moiré is eliminated or suppressed is generated.

Accordingly, when the luminance of the display panel is to be measured, moiré is suitably removed, and a third image with a preferable resolution can be generated by interpolating the spatial frequency component that was lost accompanying the removal of the moiré.

In this aspect, a sum of a transmittance of the high-pass filter and a transmittance of the low-pass filter is a constant value at any spatial frequency.

According to this configuration, the sum of the transmittance of the high-pass filter and the transmittance of the low-pass filter is a constant value at any spatial frequency. Accordingly, due to the fact that there is no failure to extract the spatial frequency component in the spatial frequency region, a third image with a high resolution and no loss of spatial frequency components can be generated.

In this aspect, the image processing method includes a first alignment step of capturing an in-focus image of a first alignment pattern formed by illuminating predetermined pixels of the display panel, detecting imaging pixels of the camera on which the first alignment pattern is projected, and supplying the imaging pixels to calculate a correspondence relationship between the pixels of the panel and the imaging pixels of the camera during image capture in the in-focus image capturing step; and a second alignment step of capturing an out-of-focus image of a second alignment pattern formed by illuminating predetermined pixels of the display panel, detecting imaging pixels of the camera on which the second alignment pattern is projected, and supplying the imaging pixels to calculate a correspondence relationship between the pixels of the panel and the imaging pixels of the camera during image capture in the out-of-focus image capturing step.

According to this configuration, in the first alignment step, the pixels of the display panel and the imaging pixels of the camera at the time of image capture in the in-focus image capture step are suitably linked, and in the second alignment step, the pixels of the display panel and the imaging pixels of the camera at the time of image capture in the out-of-focus image capture step are suitably linked.

Accordingly, due to the fact that the first image and the second image are generated with the correspondence relationship between the pixels and the imaging pixels being suitably established, a preferable third image can be generated.

In another aspect, an image processing apparatus includes a camera in which imaging pixels are aligned periodically and that is for capturing a display image of a display panel in which pixels are aligned periodically, the image processing apparatus being configured to process the image captured by the camera, including: a high-pass filter for generating a first image by removing or reducing spatial frequency components corresponding to moiré from the captured image captured by the camera with the display image in-focus; a low-pass filter for generating a second image based on a captured image captured out-of-focus by the camera; and an image compositing unit for generating a third image in which the moiré is eliminated or suppressed, by compositing the first image and the second image.

With this configuration, the first image is generated by applying the high-pass filter to the captured image captured in-focus in the in-focus image capturing step and removing or reducing the spatial frequency component corresponding to the moiré, and the second image is generated by applying the low-pass filter to the captured image captured out-of-focus in the out-of-focus image capturing step.

The thus-generated first image and second image are composited, the spatial frequency component that was lost due to the moiré being removed from or reduced in the first image is interpolated using the second image, which was generated by applying the low-pass filter, and thereby a third image in which moiré is eliminated or suppressed is generated.

Accordingly, when the luminance of the display panel is to be measured, moiré is suitably removed, and a third image with a preferable resolution can be generated by interpolating the spatial frequency component that was lost accompanying the removal of the moiré.

In this aspect, a sum of a transmittance of the high-pass filter and a transmittance of the low-pass filter is a constant value at any spatial frequency.

According to this configuration, the sum of the transmittance of the high-pass filter and the transmittance of the low-pass filter is a constant value at any spatial frequency. Accordingly, due to the fact that there is no failure to extract the spatial frequency component in the spatial frequency region, a third image with a high resolution and no loss of spatial frequency components can be generated.

In this aspect, the image processing apparatus includes a control unit configured to capture an in-focus image of a first alignment pattern formed by illuminating predetermined pixels of the display panel, detect imaging pixels of the camera on which the first alignment pattern is projected, and calculate a correspondence relationship between the pixels of the panel and the imaging pixels of the camera during image capture in the in-focus image capturing step, and capture an out-of-focus image of a second alignment pattern formed by illuminating predetermined pixels of the display panel, detect imaging pixels of the camera on which the second alignment pattern is projected, and calculate a correspondence relationship between the pixels of the panel and the imaging pixels of the camera during image capture in the out-of-focus image capturing step.

According to this configuration, the pixels of the display panel and the imaging pixels of the camera at the time of image capture in the in-focus image capturing step are suitably linked, and the pixels of the display panel and the imaging pixels of the camera at the time of image capture in the out-of-focus image capturing step are suitably linked.

Accordingly, due to the fact that the first image and the second image are generated with the correspondence relationship between the pixels and the imaging pixels being suitably established, a preferable third image can be generated.

Advantageous Effects of Invention

According to the invention, when the luminance of a display panel is to be measured, moiré can be suitably removed, and an image with a suitable resolution can be composited.

BRIEF DESCRIPTION OF DRAWINGS

FIG. 7 is a flowchart showing a process of image processing work performed by the same image processing apparatus according to the embodiment.

DESCRIPTION OF EMBODIMENTS

Next, an embodiment of the present invention will be described with reference to FIGS. 1 to 8. Note that in the present embodiment, as an example, a case will be described in which a display panel is an image quality-adjusting organic EL panel.

Figure 1:
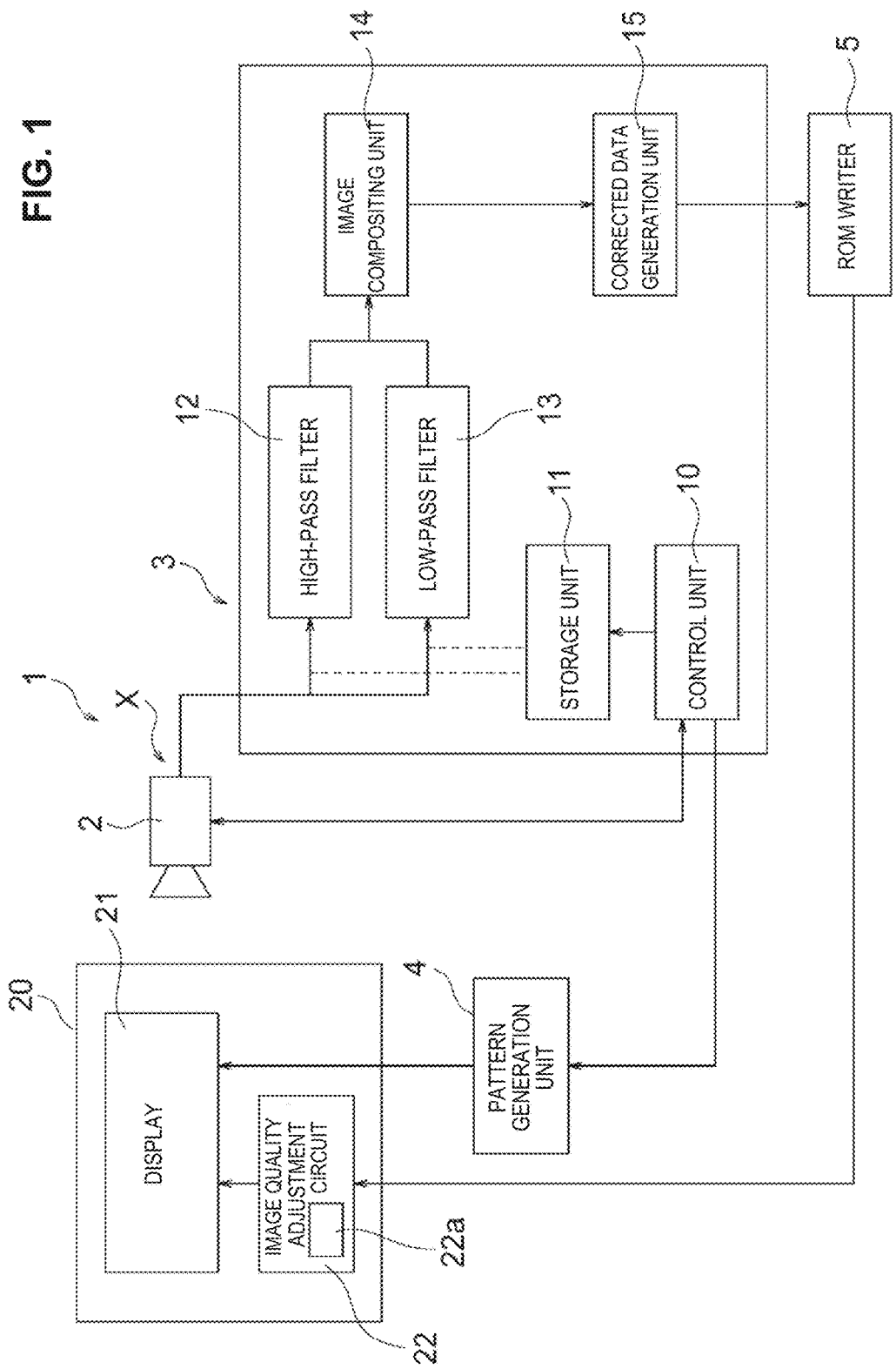
FIG. 1 is a block diagram illustrating an overview of an image processing apparatus according to an embodiment of the present invention.

FIG. 1 is a block diagram illustrating an overview of an image processing apparatus according to the present embodiment. An overview of the organic EL panel of the present embodiment will be described prior to the description of the image processing apparatus.

An organic EL panel 20 includes a display 21 in which pixels having R (red), G (green), and B (blue) sub-pixels are arranged periodically. The display 21 is such that upon receiving input of an image signal, an image signal in accordance with later-described corrected data is output by an image quality adjustment circuit 22 built into a ROM 22a, whereby a decrease in display unevenness is achieved.

The image processing apparatus 1 is an apparatus that adjusts the image quality at a final stage of the manufacturing step of this kind of organic EL panel 20, and includes a camera 2, an image processing unit 3, a pattern generation unit 4, and a ROM writer 5.

In the present embodiment, the camera 2 is constituted by a camera in which a solid-state image sensor (CCD) is mounted, and the camera 2 captures a display image of the organic EL panel 20.

The camera 2 is arranged at an image capturing position X facing the organic EL panel 20, and at this image capturing position X, the optical system of the camera 2 is set such that the pitch of images of pixels (pixel pitch) formed on the imaging plane (on the solid-state image sensor) of the camera 2 is close to an integer multiple (e.g., 1, 2, 3, etc.) and an integer fraction (e.g., ½, ⅓, etc.) of the imaging pixel pitch of the solid-state image sensor, whereby moiré that appears when the display image of the organic EL panel 20 is captured in-focus is consolidated in a low spatial frequency region (e.g., a region that is ¹⁄₁₀ or less of the Nyquist frequency) of the captured image.

The image processing unit 3 is a device that processes the image captured by the camera 2, and includes a control unit 10, a storage unit 11, a high-pass filter 12, a low-pass filter 13, an image compositing unit 14, and a corrected data generation unit 15.

The pattern generation unit 4 displays a predetermined pattern image (e.g., a later-described alignment pattern PA or luminance measurement pattern) on the organic EL panel 20, and the ROM writer 5 is a device that writes the later-described corrected data generated by the corrected data generation unit 15 in the ROM 22a built into the image quality adjustment circuit 22.

Next, a specific configuration of the units of the image processing unit 3 will be described.

The control unit 10 controls the units of the image processing unit 3 and controls image capture performed by the camera 2, image display on the organic EL panel 20 performed by the pattern generation unit 4, and writing in the ROM 22a performed by the ROM writer 5. Images captured by the camera 2 and the like are stored in the storage unit 11.

Figure 2A:
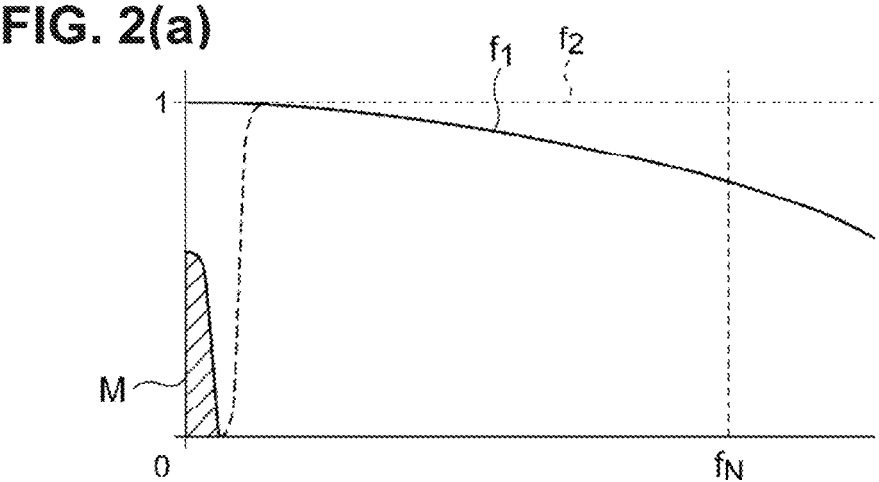
FIG. 2(a) to FIG. 2(c) are conceptual diagrams showing a spatial frequency characteristic of a captured image captured by a camera of the same image processing apparatus according to the embodiment.

The high-pass filter 12 removes or reduces the components of the low spatial frequency region corresponding to moiré if moiré appears in an image captured by the camera 2, and the high-pass filter 12 has a filter characteristic f2 indicated by the broken line in FIG. 2(a). For example, if the image captured in-focus by the camera 2 is that shown in FIG. 3(a), the image becomes like that shown in FIG. 3(b) when the high-pass filter 12 is applied thereto.

Figure 2B:
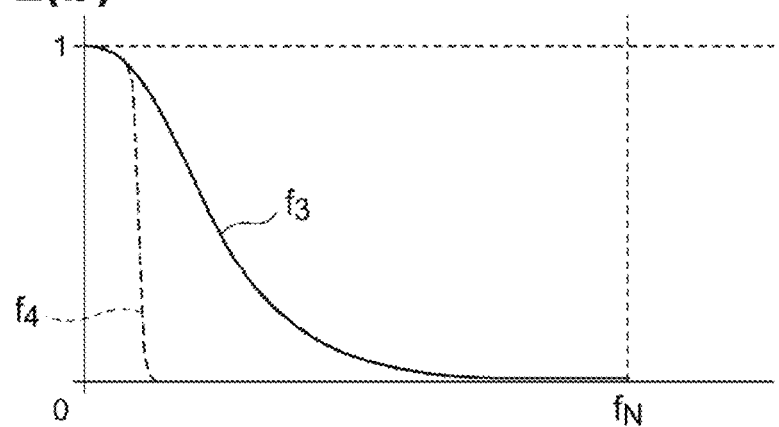

On the other hand, the low-pass filter 13 extracts the components of the low spatial frequency region that were removed or reduced by the high-pass filter 12, and has a filter characteristic f4 indicated by the broken line in FIG. 2(b). For example, if the image captured out-of-focus by the camera 2 is that shown in FIG. 4(a), which corresponds to FIG. 3(a), the image becomes like that shown in FIG. 4(b) when the low-pass filter 13 is applied thereto.

Figure 2C:
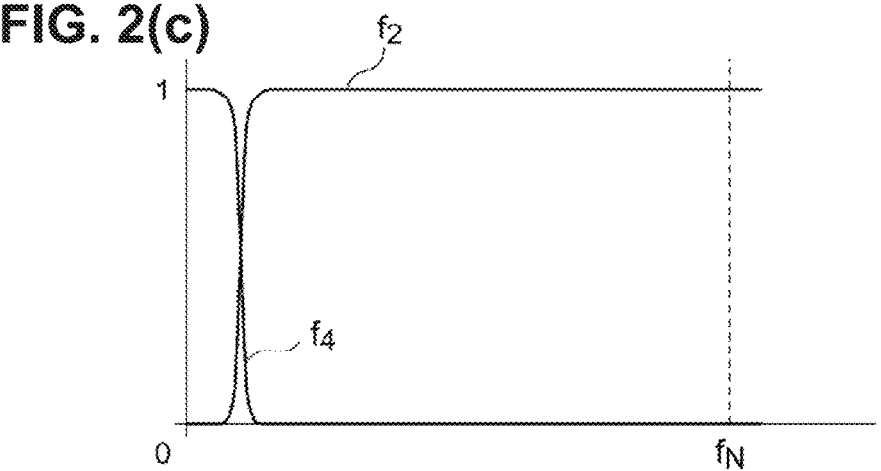

In the present embodiment, as shown in FIG. 2(c), the high-pass filter 12 and the low-pass filter 13 employ relative characteristic compensation circuit configurations according to which "transmittance of high-pass filter+transmittance of low-pass filter=1" is satisfied for any spatial frequency over a range in which the spatial frequency region ranges from 0 to the Nyquist frequency $f_N$.

Figure 3A:
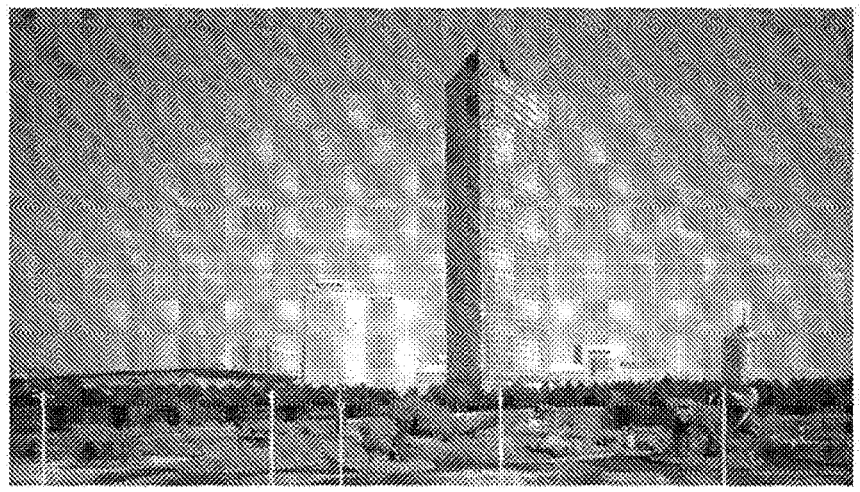
FIG. 3(a) and FIG. 3(b) are diagrams conceptually showing image processing performed by the same image processing apparatus according to the embodiment.
Figure 3B:
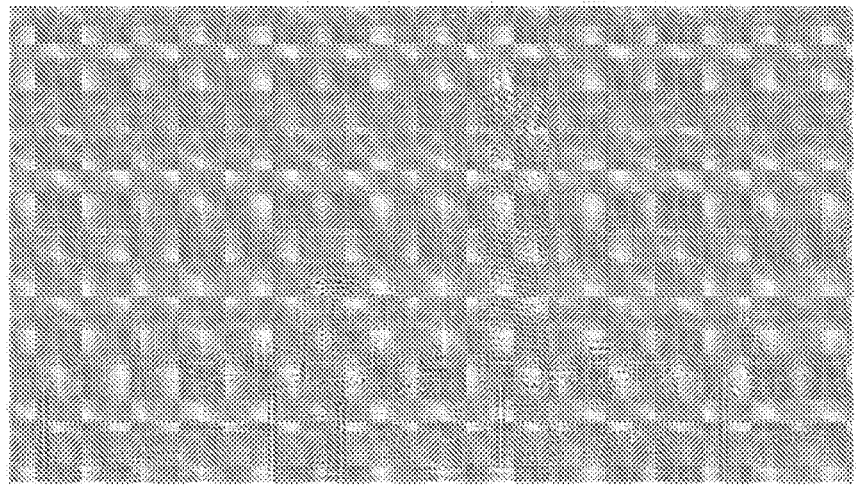
Figure 4A:
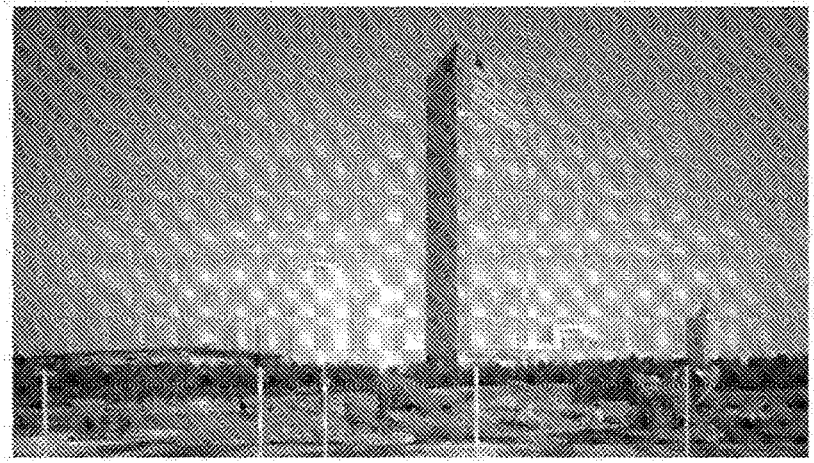
FIG. 4(a) and FIG. 4(b) are diagrams conceptually showing image processing performed by the same image processing apparatus according to the embodiment.
Figure 4B:
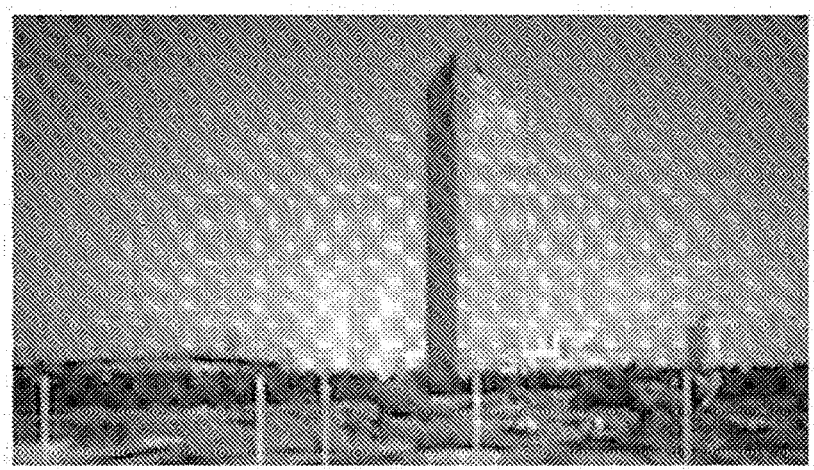
Figure 5:
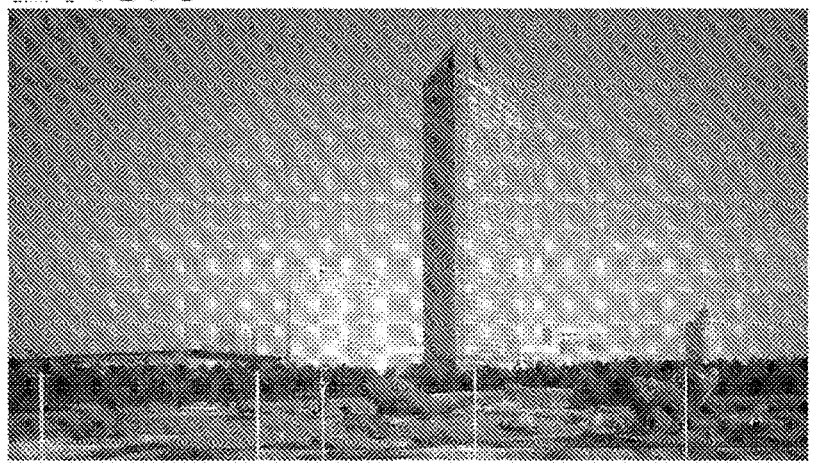
FIG. 5 is a diagram conceptually showing image processing performed by the same image processing apparatus according to the embodiment.

The image compositing unit 14 composites a new image by overlaying the image obtained by applying the high-pass filter 12 and the image obtained by applying the low-pass filter 13, and for example, the composite image shown in FIG. 5 is generated when the image shown in FIG. 3(b) and the image shown in FIG. 4(b) are overlaid.

Based on the image composited by the image compositing unit 14 (FIGS. 3 to 5 show exemplary illustrations for the purpose of convenience in describing the filter characteristics, and in actuality, the operation is performed based on the composite image obtained by capturing the later-described luminance measurement pattern, not the composite image shown in FIG. 5), the corrected data generation unit 15 generates corrected data in which luminance unevenness of the organic EL panel 20 is reduced by adjusting the output of the image signal.

Next, image processing work performed by the image processing apparatus 1 according to the present embodiment will be described based on the flowchart in FIG. 7 showing a process of processing work performed by the image processing apparatus 1.

First, in a state in which the camera 2 is set in advance at an image capturing position X such that the pixel pitch is close to being an integer multiple of the imaging pixel pitch, in step S1, the control unit 10 causes an alignment pattern $P_A$, which is a first alignment pattern, to be displayed on the organic EL panel 20 as illustrated.

Figure 6:
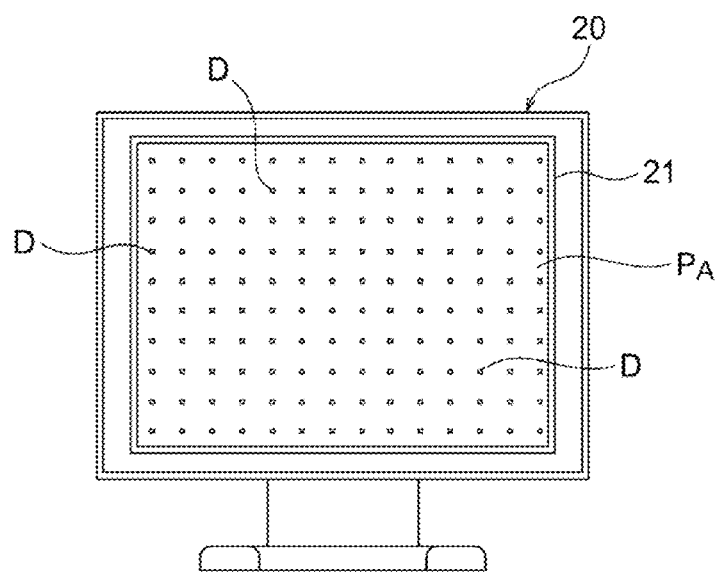
FIG. 6 is a diagram illustrating an overview of an alignment pattern generated by a pattern generation unit of the same image processing apparatus according to the embodiment.

As shown in FIG. 6, the alignment pattern $P_A$ is formed by specific pixels at known locations on the display 21 being illuminated and dots D being aligned vertically and horizontally.

In step S2, the control unit 10 captures the alignment pattern $P_A$ displayed on the organic EL panel 20 in-focus using the camera 2. After the alignment pattern $P_A$ is captured, in step S3, all of the pixels of the organic EL panel 20 are illuminated, and a luminance measurement pattern is displayed over the entire display 21.

Figure 8A:
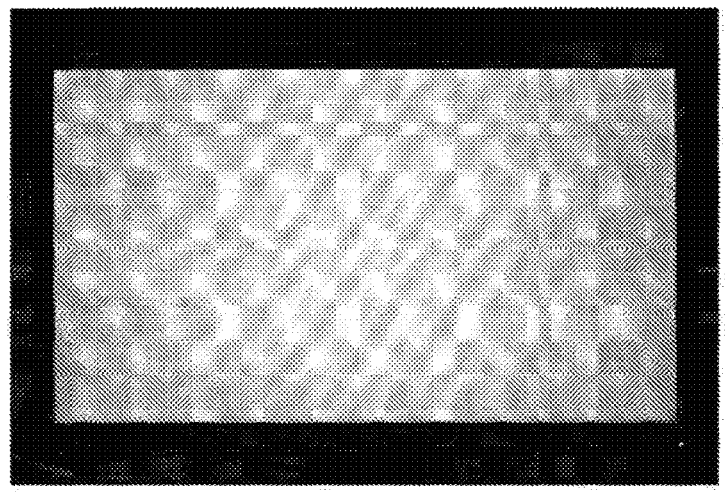
FIG. 8(a) and FIG. 8(b) are diagrams showing image processing performed by the same image processing apparatus according to the embodiment.

In step S4, the luminance measurement pattern displayed on the organic EL panel 20 is captured in-focus by the camera 2 (in-focus image capture step). As shown in FIG. 8(a), moiré, which is interference fringe, appears in the low spatial frequency region in the thus-captured image.

On the other hand, in step S5, the imaging pixels of the camera 2 on which the dots D of the captured image of the alignment pattern $P_A$ are reflected are detected (first alignment step).

That is, because the pixels constituting the alignment pattern PA are known, the correspondence relationship between the pixels and the imaging pixels at the time of in-focus image capture is obtained by detecting which imaging pixels of the camera 2 receive the light of the images of the pixels.

Based on the obtained correspondence relationship, in step S6, alignment processing is performed on the image captured in-focus.

In step S7, the control unit 10 applies the high-pass filter 12 to the captured image resulting from the alignment processing, which was obtained in step S6.

By applying the high-pass filter 12, as shown in FIG. 2(a), the spatial frequency component a1 of the portion at which the moiré M is concentrated is cut, whereby the leftover spatial frequency component a2 is extracted, and a first image is generated (first image generation step).

In other words, by applying the filter characteristic f2 indicated by the broken line to the spatial frequency f1 indicated by the solid line in FIG. 2(a), the spatial frequency component a1 corresponding to the moiré M is cut from the spatial frequency f1.

The generated first image is stored in the storage unit 11 in step S8.

After the first image is generated in this manner, in step S9, the alignment pattern $P_A$, which is the second alignment pattern, is displayed on the organic EL panel 20.

Note that in the present embodiment, a case is described in which the first alignment pattern and the second alignment pattern are the same alignment pattern $P_A$, but it is also possible for the first alignment pattern and the second alignment pattern to be different from each other.

In step S10, the alignment pattern $P_A$ displayed on the organic EL panel 20 is captured out-of-focus by the camera 2. After the alignment pattern $P_A$ is captured, in step S11, a luminance measurement pattern is displayed over the entire organic EL panel 20, similarly to step S3.

Figure 8B:
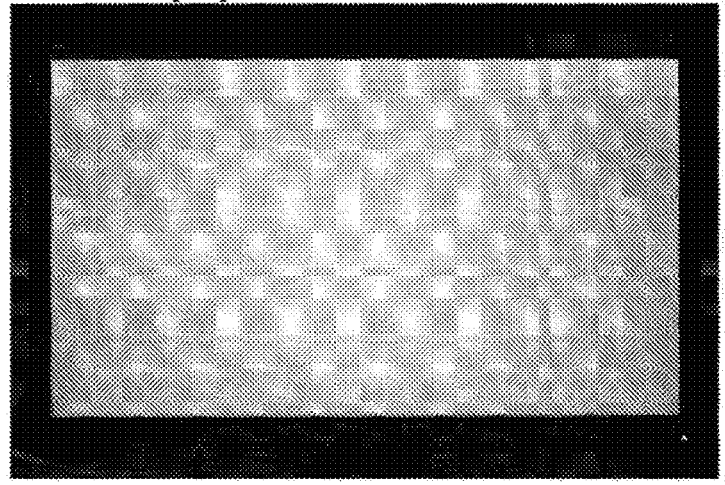

In step S12, the luminance measurement pattern displayed on the organic EL panel 20 is captured out-of-focus by the camera 2 (out-of-focus image capture step). The thus-captured image has a lower resolution, as shown in FIG. 8(b).

Next, in step S13, the imaging pixels of the camera 2, on which the dots D of the captured image of the alignment pattern PA are reflected, are detected (second alignment step).

The correspondence relationship between the pixels and the imaging pixels at the time of out-of-focus image capture is obtained by detecting which pixels of the camera 2 receive the light of the images of the pixels constituting the alignment pattern PA, and based on the correspondence relationship, in step S14, alignment processing is performed on the image captured out-of-focus.

In step S15, the control unit 10 applies the low-pass filter 13 to the spatial frequency of the captured image resulting from the alignment processing, which was obtained in step S14.

By applying the low-pass filter 13, as shown in FIG. 2(b), the spatial frequency component b1 corresponding to the spatial frequency component a1 that was removed by the high-pass filter 12 is extracted, the remaining spatial frequency component b2 is cut, and the second image is generated (second image generation step).

In other words, by applying the filter characteristic f4 indicated by the broken line to the spatial frequency f3 indicated by the solid line in FIG. 2(b), the remaining spatial frequency component b2 from which the spatial frequency component b1 was extracted is cut from the spatial frequency f3.

The generated second image is stored in the storage unit 11 in step S16.

Thus, after the first image and second image are generated, in step S17, the first image and the second image are overlaid by the image compositing unit 14.

Accordingly, a third image is composited (third image generation step), and an image in which moiré is eliminated or suppressed is generated for the luminance measurement pattern. The luminance of the pixels constituting the organic EL panel 20 is obtained using the third image and the alignment data.

Note that if the luminance of each pixel is to be measured, the luminances of pixels in a portion projected on an imaging pixel may be measured as the luminance of one pixel by measuring the output of the imaging pixel in the portion on which the pixels were projected.

On the other hand, in step S18, corrected data is generated based on the third image, and in step S19, the generated corrected data is written in the ROM 22a of the image quality adjustment circuit 22 by the ROM writer 5.

Due to the corrected data being written in the ROM 22a, the image quality adjustment circuit 22 is implemented in the organic EL panel 20.

With the organic EL panel 20 in which the image quality adjustment circuit 22 is implemented, when an image signal is input, the corrected data written in the ROM 22a by the image quality adjustment circuit 22 is referenced, an image signal in accordance with the referenced corrected data is output, and reduction of display unevenness of the organic EL panel 20 is achieved.

With the image processing apparatus 1 having the above-described configuration, the spatial frequency component a1 that corresponds to moiré is cut from the image captured in-focus by applying the high-pass filter 12, and thus the remaining spatial frequency component a2 is extracted, generating the first image.

On the other hand, the second image is generated by applying the low-pass filter 13 to the image captured out-of-focus and extracting only the spatial frequency component b1 corresponding to the spatial frequency component a1 that was removed by the high-pass filter 12.

The third image, in which moiré is eliminated or suppressed, is generated by the first image and the second image being overlaid by the image compositing unit 14 and the spatial frequency component a1 that was lost due to the moiré being cut from the first image being interpolated using the spatial frequency component b1 extracted from the second image.

Accordingly, it is possible to generate a third image with a preferable resolution, in which the spatial frequency component b1 has been added with the moiré suitably removed.

Moreover, in the present embodiment, a circuit configuration is formed such that the sum of the transmittances of the high-pass filter 12 and the low-pass filter 13 is 1, which is a constant value.

Accordingly, due to the fact that there is no failure to extract the spatial frequency component in the spatial frequency region, it is possible to generate a third image with a high resolution without losing the spatial frequency component.

Furthermore, when generating the first image and the second image that are to be used to composite the third image, in the present embodiment, the first image and the second image are generated with the alignment of the pixels of the organic EL panel 20 and the imaging pixels of the camera 2 determined. Accordingly, the correspondence relationship between the pixels and the imaging pixels can be suitably established, and a preferable third image can be generated.

In this way, when the luminance of the organic EL panel 20 is to be measured, it is possible to generate suitable corrected data based on the third image due to the fact that a third image with a suitable resolution, in which moiré is suitably removed, is generated.

As a result, the image quality of the organic EL panel 20 is adjusted using the corrected data generated based on an accurately-measured luminance, and a reduction of display unevenness is achieved. Accordingly, it is possible to obtain organic EL panels 20 in which individual product variation is suppressed.

Note that the present invention is not limited to the above-described embodiments and can be modified in various ways without departing from the gist of the invention. In the above-described embodiments, a case was described in which in-focus image capture and out-of-focus image capture were performed by a single camera 2, but in-focus image capture and out-of-focus image capture may be performed by respective separate cameras.

Accordingly, the process work time (tact time) of the processing work performed by the image processing apparatus 1 is shortened.

In the above-described embodiment, a case was described in which the image processing apparatus 1 adjusts the image quality of the organic EL panel 20, but it is also possible to use a liquid crystal panel, a plasma display, a projecting-type projector, or the like, for example.

LIST OF REFERENCE CHARACTERS

1 Image processing apparatus
2 Camera
3 Image processing unit
4 Pattern generation unit
10 Control unit
12 High-pass filter
13 Low-pass filter
14 Image compositing unit
15 Corrected data generation unit
20 Organic EL panel (display panel)
f1 to f4 Spatial frequency
M Moiré
X Image capturing position

The invention claimed is:

1. An image processing method of capturing a display image of a display panel in which pixels are aligned periodically using a camera in which imaging pixels are aligned periodically, and processing the image captured by the camera, comprising:
   an in-focus image capturing step of capturing the display image in-focus using the camera;
   a first image generation step of generating a first image by applying a high-pass filter to the image captured in the in-focus image capturing step and removing or reducing a spatial frequency component corresponding to moiré that appears in the captured image;
   an out-of-focus image capturing step of capturing the display image out-of-focus using the camera;
   a second image generation step of generating a second image by applying a low-pass filter to the image captured in the out-of-focus image capturing step; and
   a third image generation step of generating a third image in which the moiré is eliminated or suppressed, by compositing the first image and the second image.

2. The image processing method according to claim 1, wherein
   a sum of a transmittance of the high-pass filter and a transmittance of the low-pass filter is a constant value at any spatial frequency.

3. The image processing method according to claim 1, comprising:
   a first alignment step of capturing an in-focus image of a first alignment pattern formed by illuminating predetermined pixels of the display panel, detecting imaging pixels of the camera on which the first alignment pattern is projected, and supplying the imaging pixels to calculate a correspondence relationship between the pixels of the panel and the imaging pixels of the camera during image capture in the in-focus image capturing step; and
   a second alignment step of capturing an out-of-focus image of a second alignment pattern formed by illuminating predetermined pixels of the display panel, detecting imaging pixels of the camera on which the second alignment pattern is projected, and supplying the imaging pixels to calculate a correspondence relationship between the pixels of the panel and the imaging pixels of the camera during image capture in the out-of-focus image capturing step.

4. An image processing apparatus that includes a camera in which imaging pixels are aligned periodically and that is for capturing a display image of a display panel in which pixels are aligned periodically, the image processing apparatus being configured to process the image captured by the camera, comprising:
   a high-pass filter for generating a first image by removing or reducing spatial frequency components corresponding to moiré from the captured image captured by the camera with the display image in-focus;
   a low-pass filter for generating a second image based on a captured image captured out-of-focus by the camera; and
   an image compositing unit for generating a third image in which the moiré is eliminated or suppressed, by compositing the first image and the second image.

5. The image processing apparatus according to claim 4, wherein a sum of a transmittance of the high-pass filter and a transmittance of the low-pass filter is a constant value at any spatial frequency.

6. The image processing apparatus according to claim 4, comprising a control unit configured to:
   capture an in-focus image of a first alignment pattern formed by illuminating predetermined pixels of the display panel, detect imaging pixels of the camera on which the first alignment pattern is projected, and calculate a correspondence relationship between the pixels of the panel and the imaging pixels of the camera during image capture in the in-focus image capturing step, and
   capture an out-of-focus image of a second alignment pattern formed by illuminating predetermined pixels of the display panel, detect imaging pixels of the camera on which the second alignment pattern is projected, and calculate a correspondence relationship between the pixels of the panel and the imaging pixels of the camera during image capture in the out-of-focus image capturing step.

* * * * *